Patented June 1, 1943

2,320,939

UNITED STATES PATENT OFFICE 2,320,939

REMOVAL OF MERCAPTANS FROM MERCAPTAN-SOLVENT MIXTURES

Leonard N. Leum, Upper Darby, Pa., assignor to The Atlantic Refining Company, Philadelphia, Pa., a corporation of Pennsylvania No Drawing. Application April 29, 1941, Serial No. 390,907

5 Claims. (Cl. 202—57)

The present invention relates to a method for removing mercaptans from organic solvents containing same, and more particularly to the removal of mercaptans from mercaptan-alcohol mixtures produced during the regeneration of spent alcoholic alkali solutions resulting from the treatment of mercaptan-containing hydrocarbon oils with alcoholic alkali solutions.

It has been proposed heretofore to desulfurize hydrocarbon oils, and particularly gasoline, by treating same with alcoholic alkali solutions or alcoholic alkali solutions containing varying amounts of water, whereby mercaptans contained in the gasoline are converted into alkali mercaptides and extracted from the oil. It has also been proposed to regenerate the spent alcoholic alkali solutions containing mercaptides by distilling the alcohol from the spent solution and thereafter heating the residue to decompose the mercaptides and drive off the resulting mercaptans, whereby the alkali is regenerated for reuse. However, one of the major difficulties encountered in this method of regeneration is that in the initial distillation to recover the alcohol from the spent solution, considerable quantities of mercaptans are liberated and thus contaminate the recovered alcohol, thereby rendering same unfit for reuse in the desulfurization of additional quantities of gasoline.

In accordance with the present invention, I am able to remove from a mercaptan-solvent mixture, and particularly a mercaptan-alcohol mixture, sufficient of the mercaptan content to produce alcohol suitable for use in the desulfurization of hydrocarbon oils. This I accomplish by vaporizing the mercaptan-alcohol mixture and passing the vapors into intimate contact with an easily-reducible metal oxide, preferably copper oxide, at a temperature sufficiently elevated to maintain the mixture in the vapor phase and to convert the mercaptans to disulfides without substantial degradation of the alcohol. The disulfides may then be separated from the alcohol by fractional distillation. I prefer to employ conversion temperatures between about 150° F. and 350° F. at substantially atmospheric pressure, although I may obtain conversion at somewhat lower temperatures, for example, as low as 100° F., provided the pressure is reduced sufficiently to maintain the mixture in the vapor phase at such temperature. I have found that unless the treatment is carried out substantially in the vapor phase, i. e., no condensation and wetting of the metal oxide by the mercaptan-alcohol mixture, the conversion of mercaptans to disulfides is ineffective, due to the formation of metal mercaptides. While I prefer to use copper oxide in my conversion process, other metal oxides such as those of nickel, vanadium, manganese, and chromium have been found suitable. Such metal oxides may be employed singly or in admixture, with or without supporting agents such as fuller's earth, bauxite, pumice, and the like. When the metal oxide has become spent insofar as its ability to convert the mercaptans to disulfides is concerned, i. e., when the oxide has been reduced partially or completely to metal, such agent may be regenerated or revivified by steaming to remove adsorbed sulfur compounds, and then heated at an elevated temperature in the presence of air to convert the metal to the oxide.

My invention may be illustrated by the following examples, which, however, are not to be construed as limiting the scope thereof.

1. To an aqueous solution of $Cu(NO_3)_2$ was added sufficient NaOH solution to precipitate CuO, which was then washed with water to remove soluble salts, and thereafter dried. 35 parts by weight of the CuO was placed in steam jacketed tower, and 1360 parts by weight of methanol containing 60 mg. of mercaptan sulfur per 100 cc. was vaporized and passed through the CuO in the tower at 212° F., with a contact time of 1.4 seconds. The treated vapors were fractionated in a conventional fractionating column to separate the disulfides from the methanol, and the methanol thus recovered was found to contain slightly less than 1 mg. of mercaptan sulfur per 100 cc., and was entirely satisfactory for use in making up a treating agent for desulfurizing hydrocarbon oil.

2. 520 parts by weight of methanol containing 350 mg. of mercaptan sulfur per 100 cc. was vaporized and passed through the CuO of Example 1 at a temperature of 212° F. with a contact time of 1.4 seconds. The resulting mixture of methanol and disulfides was fractionally distilled to separate the disulfides from the methanol, and the methanol thus recovered was found to contain 1.2 mg. of mercaptan sulfur per 100 cc.

3. 744 parts by weight of methanol containing 350 mg. of mercaptan sulfur per 100 cc. was vaporized and passed, at a temperature of 212° F. with a contact time of 3.5 seconds, through 90 parts by weight of commercial CuO powder which had been compressed into pellets. The resulting methanol, after removal of disulfides by fractional distillation, was found to contain slightly less than 1 mg. of mercaptan sulfur per 100 cc.

4. 2000 parts by weight of methanol containing 100 mg. of mercaptan sulfur per 100 cc. was vaporized and passed, at a temperature of 212° F. with a contact time of 5 seconds, through 84 parts by weight of CuO wire. The resulting methanol, after removal of disulfides by fractional distillation, was found to contain slightly less than 1 mg. of mercaptan sulfur per 100 cc.

5. $V_2O_5$, $MnO_2$, CuO supported on fuller's earth, and NiO supported on fuller's earth, when employed in the manner described in the above examples, produced substantially the same results as shown above with respect to CuO, i. e., the mercaptan content of the treated methanol was reduced to less than about 2 mg. of mercaptan sulfur per 100 cc.

While, in the above examples, I have shown the removal of mercaptans from an organic solvent such as methanol, my process is also adapted for the removal of mercaptans from other solvents such as ethanol, propanol, isopropanol, acetone, ethyl methyl ketone, and solvents of similar nature which have been employed in conjunction with an alkaline agent for removal of sulfur compounds from hydrocarbon oils.

What I claim is:

1. The method of removing mercaptans from a lower aliphatic alcohol containing the same, which comprises vaporizing the mercaptan-alcohol mixture, contacting the vapors with an easily reducible metal oxide at an elevated temperature sufficient to convert said mercaptans to disulfides without substantial degradation of said alcohol, but insufficient to convert said mercaptan to $H_2S$ with the resultant transposition of the easily reducible metal oxide to metal sulfide, and fractionally distilling the disulfide-alcohol product to separate the disulfides from the alcohol.

2. The method of removing mercaptans from methanol containing the same, which comprises vaporizing the mercaptan-methanol mixture, contacting the vapors with an easily reducible metal oxide at an elevated temperature sufficient to convert said mercaptans to disulfides without substantial degradation of the methanol, but insufficient to convert said mercaptans to $H_2S$ with the resultant transposition of the easily reducible metal oxide to metal sulfide, and fractionally distilling the disulfide-methanol product to separate the disulfides from the methanol.

3. The method of removing mercaptans from methanol containing the same, which comprises vaporizing the mercaptan-methanol mixture, contacting the vapors with copper oxide at an elevated temperature sufficient to convert said mercaptans to disulfides without substantial degradation of the methanol, but insufficient to convert said mercaptans to $H_2S$ with the resultant transposition of the copper oxide to copper sulfide, and fractionally distilling the disulfide-methanol product to separate the disulfides from the methanol.

4. The method of removing mercaptans from methanol containing the same, which comprises vaporizing the mercaptan-methanol mixture, contacting the vapors with an easily reducible metal oxide at a temperature between 150° F. and 350° F. to convert said mercaptans to disulfides without substantial degradation of the methanol, said temperature being insufficient to convert said mercaptans to $H_2S$ with the resultant transposition of the easily reducible metal oxide to metal sulfide, and fractionally distilling the disulfide-methanol product to separate the disulfides from the methanol.

5. The method of removing mercaptans from methanol containing the same, which comprises vaporizing the mercaptan-methanol mixture, contacting the vapors with copper oxide at a temperature between 150° F. and 350° F. to convert said mercaptans to disulfides without substantial degradation of the methanol, said temperature being insufficient to convert said mercaptans to $H_2S$ with the resultant transposition of the copper oxide to copper sulfide, and fractionally distilling the disulfide-methanol product to separate the disulfides from the methanol.

LEONARD N. LEUM.